US010030121B2

(12) United States Patent
Bagui et al.

(10) Patent No.: US 10,030,121 B2
(45) Date of Patent: Jul. 24, 2018

(54) CATALYST COMPOSITION AND PROCESS FOR OBTAINING A COLORED OLEFIN POLYMER

(71) Applicant: Reliance Industries Limited, Mumbai (IN)

(72) Inventors: Mahuya Bagui, Vadodara (IN); Yogesh Popatrao Patil, Mumbai (IN); ViralKumar Patel, Nadiad (IN); Krishna Renganath Sharma, Kerala (IN); Raksh Vir Jasra, Vadodara (IN); Ajit Behari Mathur, Vadodara (IN); Uma Sankar Satpathy, Vadodara (IN); Satya Srinivasa Rao Gandham, Tadepalligudem (IN)

(73) Assignee: Reliance Industries Limited, Mumbai (IN)

( * ) Notice: Subject to any disclaimer, the term of this patent is extended or adjusted under 35 U.S.C. 154(b) by 36 days.

(21) Appl. No.: 15/088,947

(22) Filed: Apr. 1, 2016

(65) Prior Publication Data

US 2016/0289422 A1 Oct. 6, 2016

(30) Foreign Application Priority Data

Apr. 1, 2015 (IN) .......................... 1394/MUM/2015

(51) Int. Cl.
*C08F 8/00* (2006.01)
*C08K 5/3417* (2006.01)
*C08F 110/02* (2006.01)
*C08K 5/00* (2006.01)

(52) U.S. Cl.
CPC .......... *C08K 5/3417* (2013.01); *C08F 110/02* (2013.01); *C08K 5/0091* (2013.01); *C08F 2410/01* (2013.01)

(58) Field of Classification Search
CPC ......................... C08F 2410/01; C08L 2314/02
See application file for complete search history.

(56) References Cited

U.S. PATENT DOCUMENTS

| 4,564,647 A | * | 1/1986 | Hayashi | ................. C08F 10/00 523/200 |
| 5,114,990 A | * | 5/1992 | Dethlefs | ............... C08F 292/00 428/407 |
| 5,294,679 A | * | 3/1994 | Sivak | ....................... C08F 8/00 525/326.5 |
| 5,296,562 A | * | 3/1994 | Sivak | ....................... C08F 8/00 525/326.5 |
| 5,296,626 A | * | 3/1994 | Sivak | ....................... C08F 8/00 556/482 |

(Continued)

FOREIGN PATENT DOCUMENTS

| EP | 0328753 A2 | 8/1989 |
| JP | 2000226481 A | 8/2000 |
| WO | 8808856 A1 | 11/1988 |

*Primary Examiner* — Michael A Salvitti
(74) *Attorney, Agent, or Firm* — Osha Liang LLP

(57) ABSTRACT

A catalyst composition and a process for obtaining a colored olefin polymer are disclosed. The composition comprises a Ziegler-Natta catalyst and an additive component comprising a colorant. The catalyst composition enables a directly colored polymer to be prepared. The colored polymer has a homogeneous dispersion of the colorant in it and thus has no color defects.

7 Claims, 1 Drawing Sheet

A

B

(56) References Cited

U.S. PATENT DOCUMENTS

| | | | | |
|---|---|---|---|---|
| 5,329,037 A * | 7/1994 | Sivak | ............ | C08F 8/00 |
| | | | | 556/464 |
| 5,367,090 A * | 11/1994 | Sivak | ............ | C08F 8/00 |
| | | | | 556/443 |
| 6,114,023 A * | 9/2000 | Schwarz | ............ | B41M 5/0035 |
| | | | | 428/315.5 |
| 6,495,250 B1 * | 12/2002 | Schacht | ............ | C09B 47/24 |
| | | | | 428/321.3 |
| 6,511,935 B2 * | 1/2003 | Job | ............ | C08F 10/00 |
| | | | | 502/115 |
| 6,617,405 B1 * | 9/2003 | Jorgensen | ............ | C08F 10/02 |
| | | | | 502/104 |
| 9,175,108 B2 * | 11/2015 | Sarma | ............ | C08F 10/02 |
| 9,611,345 B2 * | 4/2017 | Bagui | ............ | C07F 7/006 |
| 9,624,363 B2 * | 4/2017 | Satpathy | ............ | C08L 23/06 |
| 2003/0216246 A1 * | 11/2003 | Cook | ............ | C07F 15/0093 |
| | | | | 502/104 |
| 2004/0089201 A1 * | 5/2004 | Mihan | ............ | C09B 67/0063 |
| | | | | 106/272 |
| 2009/0324920 A1 * | 12/2009 | Takeyama | ............ | B29C 55/04 |
| | | | | 428/220 |
| 2013/0281626 A1 * | 10/2013 | Tse | ............ | C08F 290/044 |
| | | | | 525/95 |
| 2014/0221515 A1 * | 8/2014 | Datta | ............ | C08J 9/0061 |
| | | | | 521/110 |
| 2016/0289422 A1 * | 10/2016 | Bagui | ............ | C08K 5/3417 |
| 2017/0009048 A1 * | 1/2017 | Al-Harthi | ............ | C08K 3/24 |

\* cited by examiner

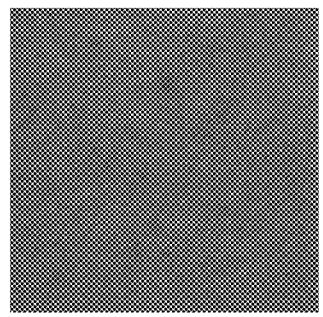 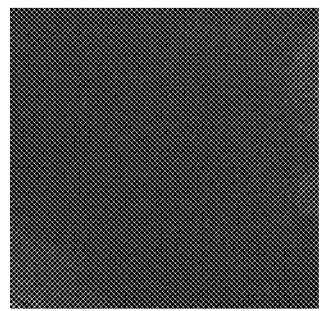
A　　　　　　　B

CATALYST COMPOSITION AND PROCESS FOR OBTAINING A COLORED OLEFIN POLYMER

FIELD

The present disclosure relates to polymers.

DEFINITIONS

Lewis base: A Lewis base is any species that donates an electron pair to an electron acceptor.

Sonication: Sonication is the process of application of sound energy, especially, ultrasound, to agitate components of a given sample.

BACKGROUND

The polymerization of olefinic monomers can be carried out using Ziegler-Natta catalyst systems. They can also be prepared using metallocene type catalyst compositions. Conventionally, such polymers are compounded with additives by dry blending the polymeric material in the form of pellets or powder with the additives and then melt blending them to form a well dispersed compounded olefin polymer.

Colorants that add aesthetic appeal to polymeric material, are also compounded first by dry blending and then by melt blending with the polyolefinic material. Another method to color olefin polymers is to melt blend them with colored master batches. Some polymers such as UHMWPE are difficult to melt blend and hence they have a limitation in adding colorants in their matrix. Also, the conventional method of coloring may result in non-uniform dispersion of the colorant.

Several entities, today, have their trademarks displayed on their advertisement billboards and product packaging. By rule, the color used in trademarks must not deviate. If the plastics used to prepare the packaging material exhibit even a slightly different color, the batch will be rejected. The conventional methods for coloring plastics do not always result in the same color and hence, cause a lot of wastage.

Hence, there is a felt need to provide for a method for coloring of olefin polymers that will result in homogeneous dispersion of the colorant in the polymer, at the same time, the plastics retain their properties in their colored form. The method of coloring should not cause any adverse effects on the polymers and should exhibit substantially the same color shade batch after batch.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to achieve olefin polymers that have homogeneous dispersion of colorants in them.

Another object of the present disclosure is to achieve olefin polymers that do not have any color defects.

Still another object of the present disclosure is to achieve colored olefin polymers that retain the properties of the uncolored olefin polymers.

Yet another object of the present disclosure is to achieve substantially the same color shade batch after batch.

Other objects and advantages of the present disclosure will be more apparent from the following description, which is not intended to limit the scope of the present disclosure.

SUMMARY

A catalyst composition for obtaining a colored olefin polymer is disclosed. The catalyst composition comprises a Ziegler-Natta catalyst and an additive component. The additive component comprises a colorant. Typically, the additive component is taken in an amount in the range of 0.005 wt % to 0.5 wt % of the amount of olefin polymer to be formed. Typically, the colorant in the additive component is present in an amount in the range of 0.005 wt % to 0.5 wt % of the amount of the olefin polymer to be formed.

The Ziegler-Natta catalyst comprises a pro-catalyst component and a co-catalyst component. Typically, the pro-catalyst component comprises at least one transition metal compound and optionally, a magnesium compound. Typically, the co-catalyst component comprises at least one organoaluminium compound.

Typically, the colorant in the additive component is a Lewis base compound. Typically, the colorant is at least one selected from the group consisting of phthalocyanine blue, phthalocyanine green, methyl violet, iso-indoline, perylene-3,4,9,10-tetracarboxylic di-anhydride, Bismarck Brown Y, and azo compounds and mixtures thereof.

In another aspect of the present disclosure, a process for preparing a colored olefin polymer is provided herein.

A Ziegler-Natta catalyst comprising a pro-catalyst component and a co-catalyst component is mixed with a first organic medium in a reactor, while stirring, to obtain a catalyst mixture. Separately, a mixture comprising an additive component comprising a colorant, and a second organic medium is sonicated in an ultrasonic bath to result in an additive component mixture. Typically, the additive component is present in an amount in the range of 0.005 wt % to 0.5 wt % of the amount of the olefin polymer to be formed. Typically, the colorant in the additive component is present in an amount in the range of 0.005 wt % to 0.5 wt % of the amount of the olefin polymer to be formed.

The additive component mixture is then added to the reactor containing the catalyst mixture while stirring to obtain a catalyst-additive component mixture. At least one olefinic monomer is then introduced into the catalyst-additive component mixture in the reactor while stirring and allowed to polymerize.

Typically, the polymerization is carried out at a temperature in the range of 50° C. to 80° C., a pressure in the range of 0.5 bar to 8 bar and for a time period in the range of 1 hr to 3 hr. The polymerized product found is a colored olefin polymer. Typically, the molar ratio of the pro-catalyst to the co-catalyst is in the range of 1:10 to 1:18.

Typically, the olefinic monomer is selected from the group consisting of $C_2$-$C_{20}$ alpha-olefins. Typically, the first organic medium is at least one selected from the group consisting of paraffins. Typically, the second organic medium is at least one selected from the group consisting of paraffins.

BRIEF DESCRIPTION OF THE ACCOMPANYING DRAWING

The present disclosure will now be described with the help of the accompanying drawing, in which:

FIG. 1 illustrates a comparison between compression molded sheets of a colored polyethylene prepared by a conventional method and the colored polyethylene prepared using the catalyst composition of the present disclosure.

DETAILED DESCRIPTION

The conventional methods of coloring of olefin polymers result in some color defects in the polymers owing to non-uniform dispersion of the colorant in the olefin polymer. This non-uniformity in the dispersion of the colorant in the polymers results in a lot of wastage as the batches which do not conform to the desired color are rejected.

Polymers like UHMWPE are difficult to melt blend and hence they have limitation in adding colors in their matrix. The present disclosure, therefore, envisages preparing olefin polymers with uniform dispersion of colorants in them and which retain their properties.

In one aspect of the present disclosure, a catalyst composition for directly obtaining a colored olefin polymer is disclosed. The catalyst composition comprises a Ziegler-Natta catalyst and an additive component. The additive component comprises a colorant. The additive component is present in an amount in the range of 0.005 wt % to 0.5 wt % of the amount of the olefin polymer to be formed. The colorant in the additive component is present in an amount in the range of 0.005 wt % to 0.5 wt % of the amount of the olefin polymer to be formed. However, higher loading of colorants in the polymer can be readily accomplished if required. The additive component may, additionally, comprise fillers, lubricants, plasticizers, and other additives.

The Ziegler-Natta catalyst comprises a pro-catalyst component and a co-catalyst component. The pro-catalyst component comprises at least one transition metal compound and optionally, a magnesium compound. The transition metal compound is selected from the group consisting of transition metal halides, transition metal alkoxides, transition metal aryloxides, transition metal oxides and transition metal halo oxides. In an embodiment of the present disclosure, the transition metal compound is a titanium compound. In a particular embodiment, the titanium compound is a titanium halide.

The magnesium compound in the pro-catalyst component is selected from the group consisting of magnesium halides, magnesium alkoxides, magnesium aryloxides, magnesium oxyhalides, and magnesium salts of inorganic acids.

The co-catalyst comprises at least one organoaluminium compound. The organoaluminium compound is selected from the group consisting of aluminium alkyls like triethyl aluminium (TEAL), triisobutyl aluminium (TIBAL), triisoprenyl aluminium (TIPRA), tri-n-octyl aluminium (TNOAL), and their homologues.

In accordance with the present disclosure, the molar ratio of the pro-catalyst component and the co-catalyst component is in the range of 1:10 to 1:18.

The colorant in the additive component is a Lewis base compound. The colorant is at least one selected from the group consisting of phthalocyanine blue, phthalocyanine green, methyl violet, iso-indoline, perylene-3,4,9,10-tetracarboxylic di-anhydride, Bismarck Brown Y, and azo compounds and mixtures thereof.

According to another aspect of the present disclosure, a process for preparing a colored olefin polymer is provided herein.

A Ziegler-Natta catalyst comprising a pro-catalyst component and a co-catalyst component is mixed with a first organic medium in a reactor, while stirring at a rotational speed in the range of 5 rpm to 300 rpm, to obtain a catalyst mixture. Separately, a mixture comprising an additive component comprising a colorant, and a second organic medium is sonicated in an ultrasonic bath for a time period in the range of 5 min to 30 min to result in an additive component mixture. The additive component is taken in an amount in the range of 0.005 wt % to 0.5 wt % of the amount of the olefin polymer to be formed. The colorant in the additive component is taken in an amount in the range of 0.005 wt % to 0.5 wt % of the amount of the olefin polymer to be formed.

The additive component mixture is then added to the reactor containing the catalyst mixture while stirring at a rotational speed in the range 5 rpm to 300 rpm to obtain a catalyst-additive component mixture. At least one olefinic monomer is then introduced into the catalyst-additive component mixture in the reactor while stirring at a rotational speed in the range of 5 rpm to 1500 rpm and allowed to polymerize. The polymerization is carried out at a temperature in the range of 50° C. to 80° C., a pressure in the range of 0.5 bar to 8 bar and for a time period in the range of 1 hr to 3 hr. The polymerized product formed is a colored olefin polymer. The olefinic monomer is selected from the group consisting of $C_2$-$C_{20}$ alpha-olefins. In a particular embodiment, the alpha-olefin is ethylene.

In the process of the present disclosure, the molar ratio of the pro-catalyst component and the co-catalyst component is in the range of 1:10 to 1:18.

The first organic medium is at least one selected from the group consisting of paraffins. In a particular embodiment, the first organic medium comprises a mixture of $C_6$ to $C_{11}$ paraffins.

The second organic medium is at least one selected from the group consisting of paraffins. In a particular embodiment, the second organic medium is Varsol™ (a high boiling $C_8$-$C_{11}$ paraffin mixture).

The obtained colored olefin polymer is further filtered, washed, and dried to isolate the colored olefin polymer. Non-limiting examples of the colored olefin polymer formed are HDPE, UHMWPE, PP, and copolymers thereof.

The colorant of the present disclosure is a Lewis base compound which has a tendency to donate electrons and interact with the transition metal center of the Ziegler-Natta catalyst. It bonds with the transition metal center of the Ziegler-Natta catalyst, thus, stabilizing the oxidation state of the transition metal to result in a modified Ziegler-Natta catalyst. During the polymerization reaction, the polymer starts to grow around the modified Ziegler-Natta catalyst metal center, enabling the uniform dispersion of the colorant in the growing polymer chain, thus, resulting in the formation of the colored polymer. The uniformity of dispersion of color results in, substantially, the same color shade batch after batch.

As the dispersion of the colorant is more uniform, the amount of colorant required to achieve a given intensity of color in the polymer product is lesser than that required by a conventional mixing process. More so, for very high melt viscosity polymers like UHMWPE, the dispersion of colorants by conventional means is very difficult due to its flow limitations. The process of the present disclosure is thus beneficial for coloring such high melt viscosity olefin polymers. Also, by adding the colorants at the polymerization stage, the mixing step is avoided which makes the process of the present disclosure simple and cost effective.

The present disclosure is further described in light of the following laboratory experiments which are set forth for illustration purpose only and not to be construed for limiting the scope of the disclosure. The following experiments can be scaled up to industrial/commercial scale and the results obtained can be extrapolated to industrial scale.

EXPERIMENTS

Experiment 1

A 1 L Buchiglasuster Polyclave reactor with multiple inlets and stirring means (a magnetic stirrer) was provided. The reactor was made oxygen and moisture free before carrying out the polymerization. It was connected to a cryogenic system to maintain the desired temperature in the reactor. All operations were carried out under nitrogen and moisture free atmosphere.

Approximately 500 mL of dry and pure Varsol™ (a high boiling $C_8$-$C_{11}$ paraffin mixture) was charged into the reactor. A 4.8 mL of co-catalyst solution was prepared separately by adding 0.48 g of triethyl aluminium to 4.8 mL hexane. Separately, 0.1159 g of pro-catalyst having the elemental composition Mg:Ti:Cl=1:1.3:3.7 is dissolved in 1 mL of hexane to obtain a pro-catalyst solution. 4.8 mL of the co-catalyst solution and 0.27 mL of the procatalyst solution were added to reactor under gentle nitrogen flow. The amounts of pro-catalyst and the co-catalyst resulted in an Al/Ti molar ratio of 14 for polymerization. In a separate vessel, a colorant mixture containing 10 mg of phthalocyanine blue colorant (colorant) and 25 mL of dry Varsol™ was taken. The colorant mixture was sonicated in an ultrasonic bath at room temperature (30° C.) for 10 min. The sonicated colorant mixture was then charged into the reactor to obtain a catalyst-colorant mixture. The reaction mixture was then bubbled with a gentle flow of ethylene gas to remove all entrapped nitrogen gas from the system. The reactor was then closed and pressurized with ethylene to 2.5 bar to initiate polymerization. Polymerization was continued at 75° C. for 2 hr. After 2 hr, when no further consumption of ethylene was observed, the reaction was stopped and its temperature was reduced to room temperature. Excess ethylene was carefully and slowly removed from the reactor and collected. The slurry from the reactor was filtered to obtain a blue colored polyethylene powder which was dried in an oven at 70° C. under vacuum for a couple of hours. The quantity of blue colored polyethylene obtained was 200 g. It was found that the polyethylene obtained was colored blue uniformly.

Experiment 2

Comparative Experiment

Polymerization was carried out in a similar manner as Experiment 1 except without adding any phthalocyanine blue colorant mixture. 215 g of white colored polyethylene powder was obtained.

TABLE 1

A comparison of colored polyethylene of Experiment 1 and the polyethylene of Experiment 2

| Colorant | Polyethylene obtained | Reduced Specific Viscosity (RSV) dL/g | Bulk Density g/cc | Remarks |
| --- | --- | --- | --- | --- |
| Phthalocyanine blue | 200 | 20.6 | 0.42 | A uniform blue powder |

TABLE 1-continued

A comparison of colored polyethylene of Experiment 1 and the polyethylene of Experiment 2

| Colorant | Polyethylene obtained | Reduced Specific Viscosity (RSV) dL/g | Bulk Density g/cc | Remarks |
| --- | --- | --- | --- | --- |
| No colorant | 215 | 18.7 | 0.46 | A uniform white powder |

Table 1 shows a comparison between the blue colored polyethylene obtained from Experiment 1 and the white polyethylene obtained from Experiment 2. The polyethylene obtained from Experiment 1 was uniformly colored polyethylene powder.

Experiment 3

Comparative Experiment 10 mg of phthalocyanine blue colorant was dissolved in 10 ml of Varsol™. This solution was mixed with 20 g of white colored polyethylene powder obtained in Experiment 2 to obtain the polymer-colorant mixture. The polymer-colorant mixture was mixed well for 20 min and then kept for drying at 70° C. for 3 hr under vacuum to obtain a dried colored polymer powder. The dried colored polymer powder was compression molded into a 0.5 mm thin sheet at 170° C. and 200 bar pressure.

The blue colored polyethylene obtained from Experiment 1 was also compression molded under identical conditions to obtain a 0.5 mm thin sheet. Both the sheets were compared for color dispersion. It was observed that the sheet made from the blue colored polyethylene obtained from Experiment 1 had far better dispersion of colorant than the sheet made conventionally.

FIG. 1 illustrates the comparison between compression molded sheets of a colored polyethylene prepared by a conventional method (A) and the colored polyethylene prepared using the catalyst composition of the present disclosure (B).

It is seen that the sheet of colored polyethylene prepared by the conventional method is lighter than the sheet of colored polyethylene prepared by the process of the present disclosure.

Experiment 4

Many batch polymerization reactions were carried out similar to Experiment 1. The blue colored polyethylene powder obtained from five batches were compression molded into sheets of 0.5 mm thickness and were checked for L*, a*, and b* values. The L*, a*, and b* values of the five batches were substantially the same indicating that every batch resulted in the same color shade. This exhibits the color consistency of the colored polyethylene from batch to batch.

TECHNICAL ADVANCES AND ECONOMICAL SIGNIFICANCE

The present disclosure described herein above has several technical advantages including, but not limited to, the realization of colored olefin polymers that:

have a homogeneous dispersion of colorants in them;
do not have any color defects;
retain the properties of the uncolored olefin polymers; and
exhibit the same color shade batch after batch.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing a colored olefin polymer, said process comprising the following steps:
   (a) adding a Ziegler-Natta catalyst comprising a pro-catalyst component and a co-catalyst component to a first organic medium in a reactor to obtain a catalyst mixture;
   (b) separately preparing an additive component mixture by sonicating a mixture comprising an additive component comprising a colorant, and a second organic medium, in an ultrasonic bath for a time period in the range of 5 min to 30 min and introducing said additive component mixture to the catalyst mixture to obtain a catalyst-additive component mixture, wherein said additive component is taken in an amount in the range of 0.005wt % to 0.5wt % of the amount of said olefin polymer to be formed and said colorant is taken in an amount in the range of 0.005wt % to 0.5wt % of the amount of said olefin polymer to be formed; and
   (c) introducing at least one olefinic monomer into said catalyst-additive component mixture in said reactor and carrying out polymerization of said olefinic monomer to obtain a colored olefin polymer.

2. The process as claimed in claim 1, wherein the polymerization is carried out at a temperature in the range of 50° C. to 80° C., a pressure in the range of 0.5 bar to 8 bar and for a time period in the range of 1 hr to 3 hr.

3. The process as claimed in claim 1, wherein said colorant is at least one selected from the group consisting of phthalocyanine blue, phthalocyanine green, methyl violet, iso-indoline, perylene-3,4,9,10-tetracarboxylic di-anhydride, Bismarck Brown Y, and azo compounds.

4. The process as claimed in claim 1, wherein the molar ratio of said pro-catalyst to said co-catalyst component is in the range of 1:10 to 1:18.

5. The process as claimed in claim 1, wherein the olefinic monomer is selected from $C_2$-$C_{20}$ alpha-olefins.

6. The process as claimed in claim 1, wherein the first organic medium is at least one selected from the group consisting of paraffins.

7. The process as claimed in claim 1, wherein the second organic medium is at least one selected from the group consisting of paraffins.

* * * * *